US008423762B2

(12) United States Patent
Aull et al.

(10) Patent No.: US 8,423,762 B2
(45) Date of Patent: Apr. 16, 2013

(54) COMMON ACCESS CARD HETEROGENEOUS (CACHET) SYSTEM AND METHOD

(75) Inventors: Kenneth W. Aull, Fairfax, VA (US); Erik J. Bowman, McLean, VA (US); James B. Rekas, Arlington, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 928 days.

(21) Appl. No.: 12/309,636

(22) PCT Filed: Jul. 25, 2006

(86) PCT No.: PCT/US2006/028825
§ 371 (c)(1),
(2), (4) Date: Jul. 1, 2009

(87) PCT Pub. No.: WO2008/013525
PCT Pub. Date: Jan. 31, 2008

(65) Prior Publication Data
US 2009/0287935 A1     Nov. 19, 2009

(51) Int. Cl.
*G06F 21/00* (2006.01)
(52) U.S. Cl.
USPC ............... 713/156; 726/8; 713/157; 713/168; 713/171; 713/175; 380/285; 455/111; 705/59; 709/224
(58) Field of Classification Search .................. 713/156, 713/171; 380/285
See application file for complete search history.

(56) References Cited

U.S. PATENT DOCUMENTS

| 7,028,181 | B1 * | 4/2006 | McCullough et al. | 713/156 |
|---|---|---|---|---|
| 7,392,387 | B2 * | 6/2008 | Balfanz et al. | 713/168 |
| 2002/0144109 | A1 * | 10/2002 | Benantar et al. | 713/156 |
| 2002/0144119 | A1 * | 10/2002 | Benantar | 713/171 |
| 2002/0176582 | A1 * | 11/2002 | Aull | 380/279 |
| 2004/0054899 | A1 * | 3/2004 | Balfanz et al. | 713/168 |
| 2004/0064691 | A1 * | 4/2004 | Lu et al. | 713/158 |
| 2004/0168061 | A1 * | 8/2004 | Kostal et al. | 713/170 |
| 2005/0071630 | A1 * | 3/2005 | Thornton et al. | 713/156 |
| 2006/0095771 | A1 * | 5/2006 | Appenzeller et al. | 713/171 |
| 2007/0008987 | A1 * | 1/2007 | Manion et al. | 370/462 |
| 2007/0174246 | A1 * | 7/2007 | Sigurdsson et al. | 707/3 |

OTHER PUBLICATIONS

Aull et al., "A Practical Public Key Infrastructure—TRW's Enterprise Directory and Security Services", TRW Systems & Information Technology Group, Technology Review Journal—Millennium Issue ¥ Fall/Winter 2000, pp. 89-106.*
Wang et al., "A Contextual Framework for Combating Identity Theft", IEEE Security & Privacy, Mar./Apr. 2006, pp. 30-38.*

\* cited by examiner

*Primary Examiner* — Morshed Mehedi
(74) *Attorney, Agent, or Firm* — Andrews Kurth LLP (57) ABSTRACT

What is disclosed is a system and method that allows a secondary certificate authority to rely on one or more existing primary certificate authorities to establish identity of a user and provide identity certificates. The secondary certificate authority applies business rules to those identity certificates to establish a community of privilege, and then issues and maintains new privilege certificates without issuing new private keys or smart cards. The new privilege certificates bind the original identity, the sponsor, i.e., the primary certificate authority, and the privilege. The new privilege certificates can be used on a Public Key Infrastructures (PKI) transaction basis, for example, to grant access to unclassified and Multi-Level Secure (MLS) resources without further reference to the existing primary certificate authorities.

17 Claims, 9 Drawing Sheets

COMMON ACCESS CARD HETEROGENEOUS (CACHET) SYSTEM AND METHOD

CROSS-REFERENCE TO RELATED APPLICATION(S)

This application claims the benefit of PCT Application No. PCT/US2006/028825, filed Jul. 25, 2006, entitled "COMMON ACCESS CARD HETEROGENEOUS (CACHET) SYSTEM AND METHOD" the subject matter of which is herein incorporated by reference in its entirety.

TECHNICAL FIELD

The technical field relates to Private Key Infrastructure (PKI) and access card systems and processes.

BACKGROUND

Current cross-certificates based Private Key Infrastructure (PKI) trust mechanisms, such as the Federal PKI Bridge, suffer from a scaling problem. Even given the topological simplification of the Federal Bridge Certificate Authority (CA), as trust bridges grow in size and complexity, the number of possible routes between a user and a relying party increase exponentially with each added CA, so that the time required for path discovery can increase beyond a tolerable delay for real-time operation. For example, up to 35 minutes for one Federal Bridge transaction has recently been reported. The standards that govern PKI, primarily X.509 and Request For Comments 3280 (RFC3280), envision a mechanism for a "relying party" in one PKI domain to accept credentials from a "user" in another domain. The relying party has one or more "trust anchors," referred to as "certificate authorities" (CAs) that the relying party trusts completely. These CAs can create cross-certificates, which specify the other CAs that this CA trusts. This process of creating cross-certificates can be repeated multiple times, resulting in a chain of trust of bridges from the trust anchor to the user/sender's certificate. However, this chain of trust must be evaluated in real time, and entails finding all the possible chain(s) of certificates between the user/sender and the trust anchor(s). This would be challenging enough even if all the certificates in the world were immediately available to select from. Generally, the only inputs to the chain of trust builder are the end-points: the user's certificate, which is available because it is included, e.g., as part of the Secure Sockets Layer version 3 (SSLv3) connection protocol, and the trust-anchor(s)', which are part of the relying party's configuration.

Building a trust chain therefore involves an iterative process of sniffing out and recovering from the Internet each "next possible link" and building the chain one link at a time. This trust chain building requirement is true for any PKI-based protocol in which a PKI certificate is exchanged as part of building the trust chain.

The dilution of trust expands exponentially with the size of the trust bridge, similar to the time to validate a remote user's certificate. For example, what does it really mean to explicitly trust the entire Department of Defense (DoD) population? When trust is further bridged with the entire Federal government workforce, the problem becomes worse. When external sources, such as the NIH-EDUCAUSE Bridge, are included to bring in all the Educational Institutes into the extended trust bridge, what does "trust" mean? In this example, the time to evaluate a PKI certificate approaches the intolerable, and the useable trust approaches zero.

This trust dilution is best illustrated with a further example. A University located in Wyoming grants access to sensitive information to users holding DoD certificates. For the purposes of this example, a subset of the users abuse their trust, and publish sensitive information at various sites on the Internet. Through audit logs, the identities of the likely offenders are established. What is the University to do? It may complain to the DoD, but the complaint is unlikely to result in any action, since it is impossible to terminate the Common Access Card (CAC) Identity without removing the offenders from their services. The University's only choices are to establish manual overrides for these users, possibly on hundreds of servers at the University or to deny all access to the DoD. By trusting everyone, the University has lost control of its data, and cannot carry out its legal obligations to protect sensitive data.

Secure Sockets Layer version 2 (SSLv2), which provides an encrypted channel and server authentication, is the gold standard of low value e-commerce sites. However, when the stakes are high, SSLv3, with client authentication, is required to positively establish, without repudiation, the identity of the user. The Secure Sockets Layer (SSL) standard requires the server to present, in the protocol handshake, a list of the Trusted Authorities that the server will accept as sources of user certificates. The standard does not provide for bridging functionality, so that in the example of a University server providing strongly authenticated access to 3,000 other Universities, the server would have to send all 3,000 University CA certificates to the end user, effectively disabling access by massively overloading the user's computer and his network. Again, the standards imply a solution that does not scale. The current prior art for large trusted root stores is the Microsoft Trusted Root Authority store, which does not accept new roots because of this very problem.

Another current system for providing cross-certificates for an organization, such as a University, is to establish a private PKI. However, it is expensive and difficult to establish a high assurance PKI using tokens, which are required for high assurance. The DoD has spent $800M (as of early 2004), and has not yet completed a high assurance PKI for its 4 Million users. Using the University as an example, where labor is "free," to establish a high assurance PKI, including the cost of tokens, Local Registration authorities, etc., the cost can easily exceed $200 per user for an initial setup. In this example, the University has to provide local registration authorities wherever its target population resides. The University must convince that target population to carry "yet another token." The University has to deal with the issues of maintaining the token password space and discovering when the privileges need to be revoked. Establishing a private PKI is not a practical solution; otherwise, major e-Commerce vendors would have adopted this method.

The original X.509v1 standard imposes a single hierarchical root in order to avoid the prior art problems as noted above. This standard, however, proved intractable from a practical standpoint, such as "who is the sole root?" The resulting X.509v3 standard allows an unlimited number of trusted roots, but does not provide any answers to scalability of numbers or of trust. For example, a wedding party of 100 guests can be managed, but this current system does not work well with 10,000 guests because of linear scaling N. If all guests are required to shake hands with each other guest, the problem explodes exponentially, to $N*(N-1)/2$.

Figure 1:
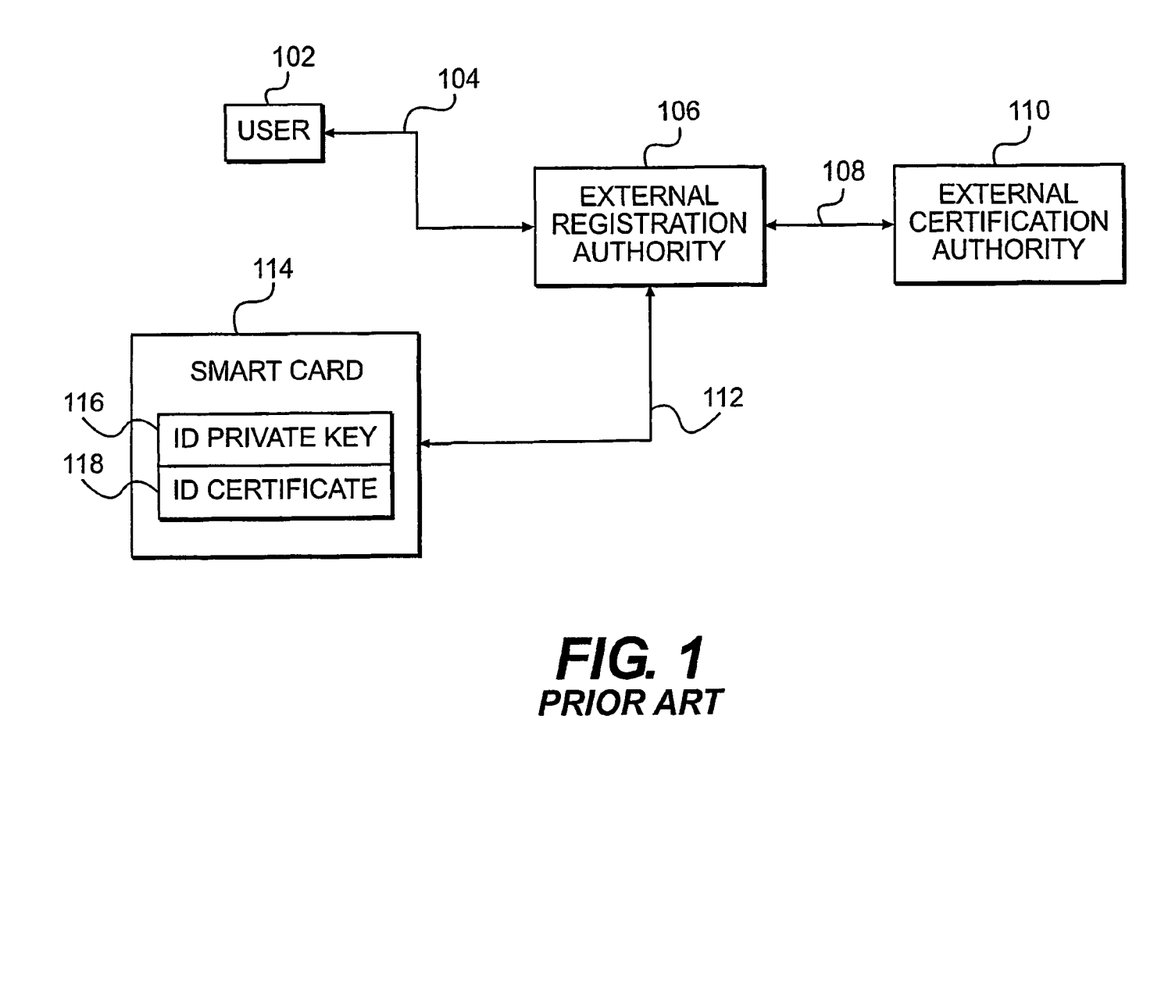
FIG. 1 illustrates a prior art system.

FIG. 1 is a prior art identity certification system. A user 102 connects with an external Registration Authority 106 that wishes to establish an identity certificate and a private key of the user 102. Through a connection 104, the user 102 passes the data required by the external Registration Authority 106. Being satisfied of the identity of user 102, the external Registration Authority 106 makes a connection 112 to a smart card 114 that is being bound to the user 102. Typically, a Personal Identification Number (PIN) is set by collaboration with the user 102, and a public-private key pair is generated on the smart card 114. The identity private key 116 is retained on the smart card 114, and the public key is returned through a connection 112. This public key is securely passed to an external CA 110 through a connection 108. The external CA 110 returns a signed identity certificate 118 over the connection 108 to the external Registration Authority 106, which uses the connection 112 to load the identity certificate 118 onto the smart card 114. In the prior art system, if the user 102 wants access to another organization, the user 102 must go through the same process again, i.e., being issued another smart card. This is costly and inefficient.

SUMMARY

What is disclosed is a computer-implemented common access card heterogeneous (CACHET) method. The method includes receiving an identity certificate from a user. The identity certificate is supplied by a first secure domain and associated with a private key that is only known to the user. The identity certificate includes a public key. The method further includes receiving a request from the user to access a second secure domain, and verifying an identity of the user using a private key infrastructure (PKI) process. If the identity certificate is proved to be issued by a trusted certificate authority (CA) and unexpired, the method further includes extracting the public key from the identity certificate, applying business rules of the second secure domain to the public key, and re-signing the public key to generate a CACHET certificate. The CACHET certificate is associated with the private key and trusted in the second secure domain. The user can then access applications and services in the second secure domain.

Also disclosed is a CACHET system that includes a first secure domain that issues an identity certificate for a user. The identity certificate is associated with a private key that is only known to the user and includes a public key. The CACHET system further includes a second secure domain that receives a request from the user for access and verifies an identity of the user using a private key infrastructure (PKI) process. The CACHET system further includes a CACHET registration authority that determines if the identity certificate is issued by a trusted certificate authority (CA) and unexpired, and applies business rules of the second secure domain against the identity presented by the user. The CACHET system further includes a CACHET CA that extracts the public key from the identity certificate, and re-signs the public key to generate a CACHET certificate. The CACHET certificate is associated with the private key and trusted in the second secure domain. The user can then access applications and services in the second secure domain.

Further disclosed is a computer readable medium providing instructions for a CACHET method. The instructions include receiving an identity certificate from a user. The identity certificate is supplied by a first secure domain and associated with a private key that is only known to the user. The identity certificate includes a public key. The instructions further include receiving a request from the user to access a second secure domain, and verifying an identity of the user using a private key infrastructure (PKI) process. If the identity certificate is proved to be issued by a trusted certificate authority (CA) and unexpired, the instructions further include extracting the public key from the identity certificate, applying business rules of the second secure domain to the public key, and re-signing the public key to generate a CACHET certificate. The CACHET certificate is associated with the private key and trusted in the second secure domain. The user can then access applications and services in the second secure domain.

DESCRIPTION OF THE DRAWINGS

Exemplary embodiments of a common access card heterogeneous (CACHET) system and method will be described in detail with reference to the following figures, in which like numerals refer to like elements, and wherein.

DETAILED DESCRIPTION

Common access card heterogeneous (CACHET) is a system and method that can be implemented by commercial off-the-shelf (COTS) products. The CACHET system and method may be arranged and configured in a specific way to achieve federation across logical trust domains. For example, if Lockheed, Boeing and NGC wish to build a joint tactical fighter, they each have a specific subset of employees assigned to the project. The project software database may only be accessed by a subset of the employees of each company. CACHET allows each employee to use his own company smartcard, thus the project's database is a federated resource that can only be accessed by a sub-set of employees from each corporation.

The CACHET system and method include, as input, a public key certificate supplied by a secure key-store or token in a first secure domain having an associated private key only known to a user. After receiving the public key included in the certificate supplied by a user in the first secure domain, the CACHET system and method verify the identity of the user by following accepted Public Key Infrastructure (PKI) processes. If the identity is acceptable to the business processes and once the user's certificate has been verified as being issued by a trusted Certificate Authority (CA), and proved to be unexpired, the CACHET system and method extract the public key from the supplied certificate and re-sign the public key, resulting in a second certificate being associated with the original private key. This second certificate is, by definition, trusted in a second secure domain. The user that supplied the original certificate has access to applications and services in the second secure domain as a result of the second signing of his public key. By adhering to established PKI principles and standards, the CACHET system and method provide a secure federation mechanism that enables logical access, non-repudiation, and audit services across logical and security domains. The CACHET system and method can concurrently manage an unlimited number of domains.

The CACHET system and method allow multiple independent organizations to control access to their data and systems by sub-setting one or more existing PKI, both external and internal, into local privilege domains. The CACHET system and method provide strong authentication of both identity and privilege using privilege certificates issued by a CACHET CA. The CACHET system and method can be used with the DoD Common Access Card (CAC) program, for example. The CAC is a homogenous system, i.e., has a well defined model for issuing PKI Certificates. When a single CA issues identity certificates to, for example, over four million users, such practice raises the question of what it means to "trust" four million users. The CACHET system and method offer an efficient mechanism to allow the diversion of identity from an unlimited number of existing PKI systems into an unlimited number of localized privilege domains. This diversion allows for the efficiency of a flat and homogenous PKI issuance process, where the expense of creating a private PKI key has been paid for by a sponsoring organization, and that private key can be used by multiple, independent organizations. The CACHET system and method enable the use of the CAC and other tokens from multiple other deployed PKI systems to create a heterogeneous trust model. For example, when a number of different PKIs are joined through CACHET, the policies and processes may be different. Even so, these different PKIs may be joined together to create a heterogeneous trust model. By accepting Lockheed, Boeing and NGC certificates, for example, to use the federated project data, the trust model may be merged into a single heterogeneous model. The policies of the different companies do not need to be changed, but are accepted as "good enough." It is possible that a fourth company may be so lax in its process that the project does not accept its policies, and the fourth company is outside the merged heterogeneous trust.

The CACHET system and method provide a standards-based, but scaleable PKI for organizations that need to maintain local control of privileges, i.e., the privileges can be cancelled. The CACHET system and method can be scaled without the expense of a classic PKI implementation. Scalability is achieved by using "other people's" PKIs. The major cost of a PKI is providing the assurance that the private key was issued to a correct identity. This assurance process may need a "face-to-face" registration to provide legal assurance of non-repudiation. Furthermore, the state of security in operating systems is such that to maintain non-repudiation, the private key needs to be stored on a physical token. These physical tokens are made secure by the issuing agency maintaining strict control over loading of data and manipulation of data on the token or smartcard.

The CACHET system and method can be used with an organization that has already established a smartcard or other physical token for its target population of users, and has issued high assurance identity certificates to all of the individuals with these smartcards or tokens. An example of such an organization is the DoD. Any relying party whose customer set is the DoD can be assured that the members of the DoD have been uniquely identified, that there has been a face-to-face registration, and that the private key is maintained solely on a high security token, which is the CAC in this example. The relying party is assured by the certificate policies that the DoD will revoke the identity certificate if the private key is lost or when the DoD no longer vouches for the identity. Furthermore, the relying party can use a well-known, published list of public certificates for each member of the DoD (Global Grid) and a well-known, published distribution point for the Certificate Revocation List (CRL).

For example, a relying party wishes to trust, in addition to a subset of the DoD users, different subsets of users from two additional well-known PKI implementations, such as the Treasury Department and the Federal Bureau of Investigation (FBI). Both of these implementations have as high assurance as the DoD. In this example, the FBI wants to maintain a set of 58 servers, one in each FBI field office, each of which contains sensitive criminal information. This information is to be limited to DoD, FBI and Treasury Department members of equivalent grade of, e.g., GS-13 and above. The FBI reserves the right to cancel the access privileges of any specific user if the FBI can prove any compromise of information from any specific user from any of the three organizations. Yet any specific compromise may not be sufficient to cause the remote organization to fire or convict the offenders in their own organization. With the CACHET system and method, accessing any of the 58 servers is a CACHET privilege, which can be cancelled by the privilege owner. The CACHET privilege is not an identity, which belongs to an external individual and sponsored by an external organizations.

Figure 2:
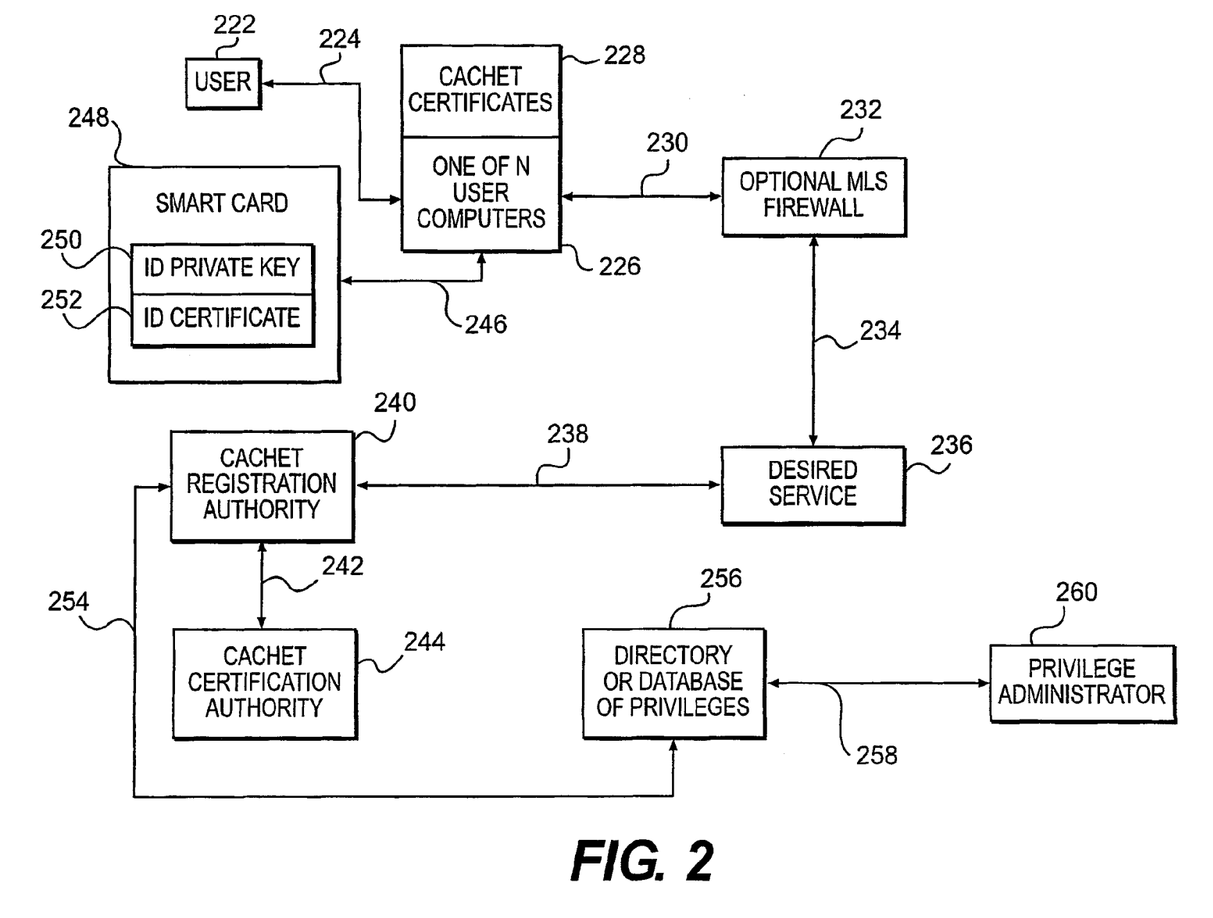
FIG. 2 illustrates an exemplary CACHET system.

In this example, each of N FBI servers may be configured such that the server's local trust store contains only the specific trust certificate of the CACHET CA that controls the privileges of accessing these N servers 236 (shown in FIG. 2). This is a simple, standard process that needs to be performed once and only once for each server in the CACHET "Trust Cloud" maintained by the specific CACHET CA 244 (shown in FIG. 2). Furthermore, these servers may be configured to provide SSLv3 strong authentication by, e.g., checking a box on the servers.

A would-be user may attempt to connect to the well-known address of any of the FBI servers. An example may be https://criminal-records.Cleveland@FBI.gov. Either previously or during the first access, the user accepts the CA for the certificate of the Server or accepts the FBI Server CA into the user's local trust store. During the standards-based creation of the SSL session, strong authentication of the user may be established by sending the CACHET CA certificate(s) from the server CACHET trust store to the user, who chooses the appropriate subordinate CACHET certificate. As shown in this example, the SSL connection is made with a trust list of 1, not N. Similarly, the user and the server, acting as relying party, evaluate their certificate trust using a path length of 1, rather than N(N+1)/2.

There may be six reasons why the establishment of a CACHET trust can fail, and the CACHET-enabled server may expeditiously manage the failure of the CACHET trust:

a) The CACHET certificate of the user is improperly signed.

b) The CACHET certificate has expired.

c) The CACHET certificate is revoked.

d) The first-time user does not yet have a CACHET certificate.

e) The user with a CACHET certificate is sitting at a new machine.

f) An untrusted would-be user does not have a CACHET certificate.

Figure 5:
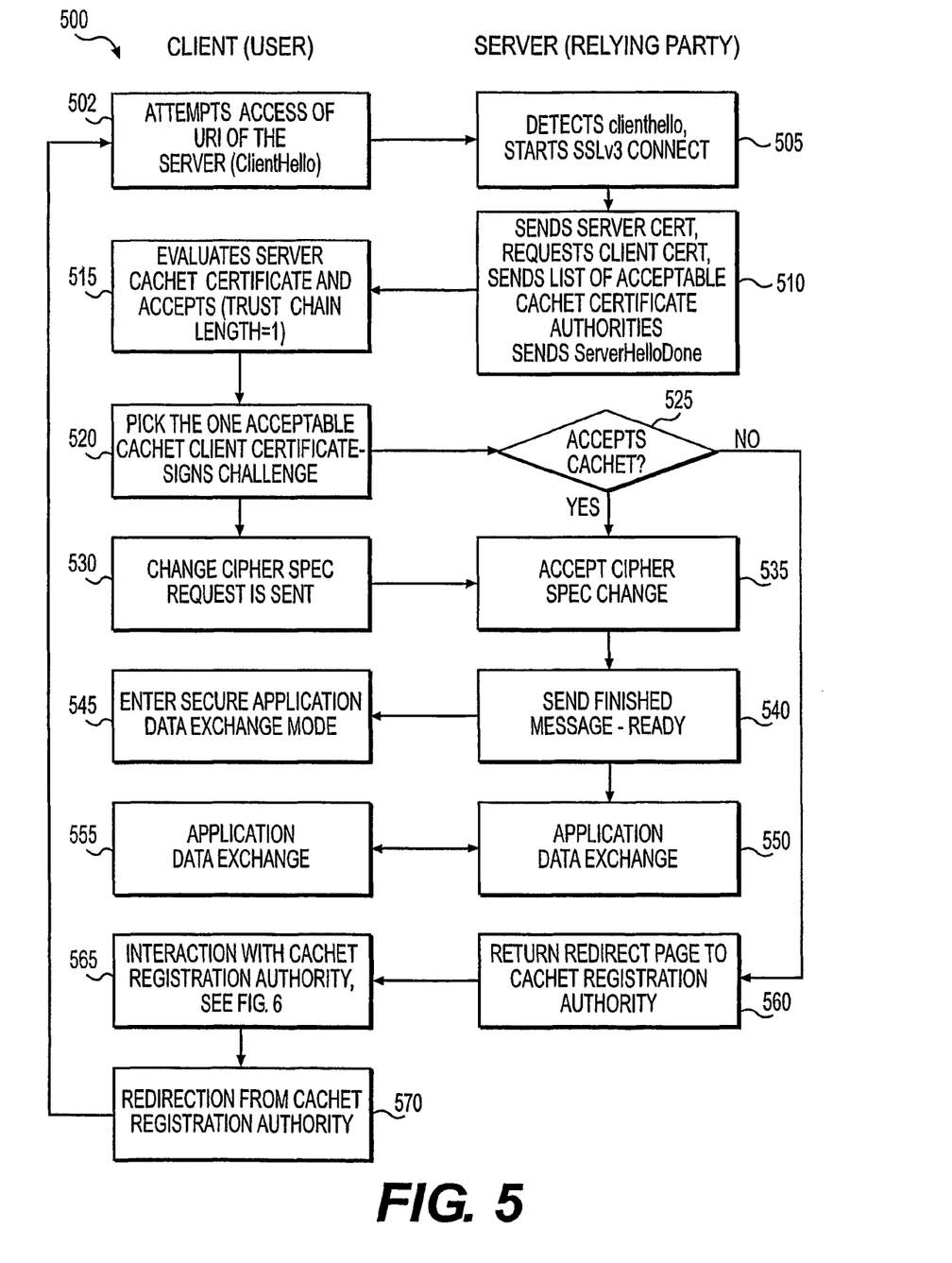
FIG. 5 is a flow chart illustrating an exemplary process of the CACHET system of FIG. 2 for accessing protected resources.

In all of these cases, the 58 individual servers in the example re-direct the user to the Registration Authority for the CACHET CA (see FIG. 5). A return trace is maintained so that after the Registration Authority corrects one or more of problems a)-f), the user may be automatically returned to the site that the user was attempting to access.

A central CACHET Registration Authority exists for each privilege class with a CACHET system. The CACHET Registration Authority establishes an SSLv3 connection with the original requestor when the user is re-directed to the CACHET Registration Authority by one of the relying servers. The CACHET Registration Authority may be preconfigured so that its trust store contains critical M out of N of possible sources of identity. In the above example, rather than the need to send out N certificates during the SSL connection, only M certificates need be sent out. In this example, M is 3, one for the DoD root, one for the FBI root, and one for the Treasury Department root. This is a huge saving in processing, latency, and bandwidth. During the connection, the user machine may respond with an appropriate certificate issued by the user's home organization, and the connection may be signed by the user's private key on the organic smartcard or token. The validity of the certificate is established using, for example, X.509 hierarchical trust chain processing. The path length is again 1, not $N(N+1)/2$.

If the user does not have a certificate from one of the M organizations, an apparent illegal attack may be logged. The CACHET Registration Authority site is only accessed if the failures a)-f) above has occurred. The processing occurs as follows.

If an identity certificate from a trusted external organization, and matching private key exist, the identity of a user is known and vouched for by the user's organization. As part of standard PKI validation, a relying party checks the Certificate Revocation List (CRL) either directly, or indirectly via an On-Line Certificate Status Protocol (OCSP) Responder to ensue that the identity of the user has not been revoked. It is possible that the user is sitting at a new machine that does not have the previously issued CACHET certificate installed. In this case, the certificate is found by the CACHET system and then downloaded. The business rules of the organization issuing the CACHET certificate are enforced in order to determine if the user is still an approved member of the subset of trusted identities. The existing CACHET certificate is presented to the user for download and installed. Once completed, the user is re-directed back to the original site. The user may not qualify for access. In this example, if the user is not on a GS-13 list, the user is not authorized to access the protected site. The user's access is denied and logged by the user's identity (case f)). The user's original CACHET certificate may be damaged or expired, in which case, a new certificate is issued by the CACHET CA and downloaded for cases a) and b). The previous CACHET certificate may have been revoked. If the certificate was revoked for cause, the access attempt is logged under the user's identity, and access is denied. Finally, the certificate may have been revoked for a valid reason, such as the loss of a smartcard, by the sponsoring identity CA. In this case, if a new card and associated identity certificate have been issued, a new CACHET certificate may be issued and downloaded.

FIG. 2 illustrates an exemplary CACHET system. A user 222 may be same as the user 102 (shown in FIG. 1) if the identity certificate 118 has not been revoked. The continuity of identity may be established by knowledge of the smart card Personal Identification Number (PIN), and possession of the smart card 248, which may be the same as the smart card 114 (in FIG. 1) unmodified. Through unspecified policy-based procedure, a privilege administrator 260 is convinced that the user 222 should be allowed access to a desired service 236, i.e., relying party. This decision/information may be loaded into a directory or database of privileges 256 over a connection 258. The directory or database of privileges 256 contains the user's identification (ID) and the sponsor certification authority as specified in an identity certificate 252, which may be the same as the identity certificate 118 (shown in FIG. 1). The user 222 is informed of the access locator of the desired service 236.

Through a connection 224, the user 222 initiates a request to a computer 226 to connect to the desired service 236. The user 222 may at various times use any number of computers 226. This connection attempt is made through a connection 230, where it may optionally pass through a firewall 232 and through a connection 234. A standards-based SSLv3 connection may be attempted by the user to connect to the desired service 236, using an identity private key 250 and the identity certificate 252. The desired service 236 recognizes that the user MAY have rights, due to the sponsorship of the external CA 110 (shown in FIG. 1). To determine whether the user have right to access, the user 222 is re-directed to a CACHET Registration Authority 240 server. This server also independently attempts a valid SSLv3 connection. This connection may supply the identity certificate 252 as a by-product. The identity and sponsor of user 222 may be extracted from the identity certificate 252, as well as the public key.

Using a connection 254, the CACHET Registration Authority 240 determines the privileges stored in the directory of database of privileges 256. If a privilege match occurs, the CACHET Registration Authority 240 uses a connection 242 to direct a CACHET CA 244 to issue a short-life CACHET certificate, by re-signing the public key from the original identity certificate 252. This public key is returned to the user computer 226 and stored in a local certificate store on that machine, and labeled as CACHET certificate 228. The user 222 may then be re-directed once more to the desired service 236, which again attempts an SSLv3 connection. In this event, the SSL protocol may request the appropriate CACHET certificate 228. This request may locate the original identity private key 252, which may authenticate directly with the desired service 236.

The SSL session continues until the expiration time of the short-life CACHET certificate 228, or until terminated by the user 222 or by the desired service 236. Many desired services 236 exist, and the CACHET issuance mechanism occurs only if a valid CACHET certificate 228 does not exist in the certificate store on the user computer 226, or if the CACHET certificate 228 has expired. Accordingly, thousands of desired services 236 that are located world-wide can be accessed with the same CACHET certificate 228 and the associated identity private key 250. If the user 222 moves to another machine, the CACHET cycle may occur again because the CACHET certificate 228 may not be located on the new machine. While the old CACHET certificate 228 is on the previous machine, it is assumed that the user 222 removes both the smart card 248 and his knowledge of the correct PIN to unlock the smart card 248. Because CACHET preserves the basic principles of PKI, strong audit and non-repudiation services can be supported across trust domains. Those skilled in the art will recognize that the major cost of a PKI is the secure establishment of the identity private key 116/250.

CACHET allows any number of privilege domains to share that private key 116/250 by creating a new CACHET privilege certificate 228 for each domain, by re-signing the public key that is associated with the original identity private key 116/250. By minimizing the trust store of root certificates to just those specific systems that are trusted for identity, the problems inherent with the PKI bridge technology may be minimized. Furthermore, since by definition, the trust root for a CACHET CA is typically always in the local trust store, the evaluation of the certificate trust chain may be local and immediate, unlike a Federal Bridge.

Since the CACHET certificates 228 lifetimes can be short, they may not need to link to certificate revocation list (CRL) or on-line certificate status protocol (OCSP) responders, there may be no need to find and evaluate a CRL/OCSP for a CACHET certificate 228. This may be an important advantage in responsiveness. The short-life CACHET certificates 228 are typically cancelled only by their own time-based expiration, because the length of the lifetime of the CACHET certificates 228 is set to achieve a tolerable level of risk to the problem of being unable to cancel an issued CACHET certificate. The lifetime should not be too long because there is a risk that a CACHET certificate 228 may still be valid when it should be cancelled. For example, if a company decides to fire an employee, and the employee has a CACHET certificate 228 on his home machine that is two weeks long, the CACHET certificate 228 cannot be immediately cancelled when the decision to fire him is made. Similarly, the lifetime should not be too short, otherwise there may be excessive requests for new CACHET certificates 228 to replace expiring certificates. For example, if a user goes to a project database but cannot finish a transaction without the CACHET certificate 228 expiring, the lifetime of the CACHET certificate 228 is too short because it impedes the user's work. The typical optimal lifetime of a CACHET certificate 228 may be, for example, eight hours. An employee showing up for work authenticates only once in the day. If the employee is fired and escorted from the company, any left-over CACHET certificates at home may already have expired.

Figure 3:
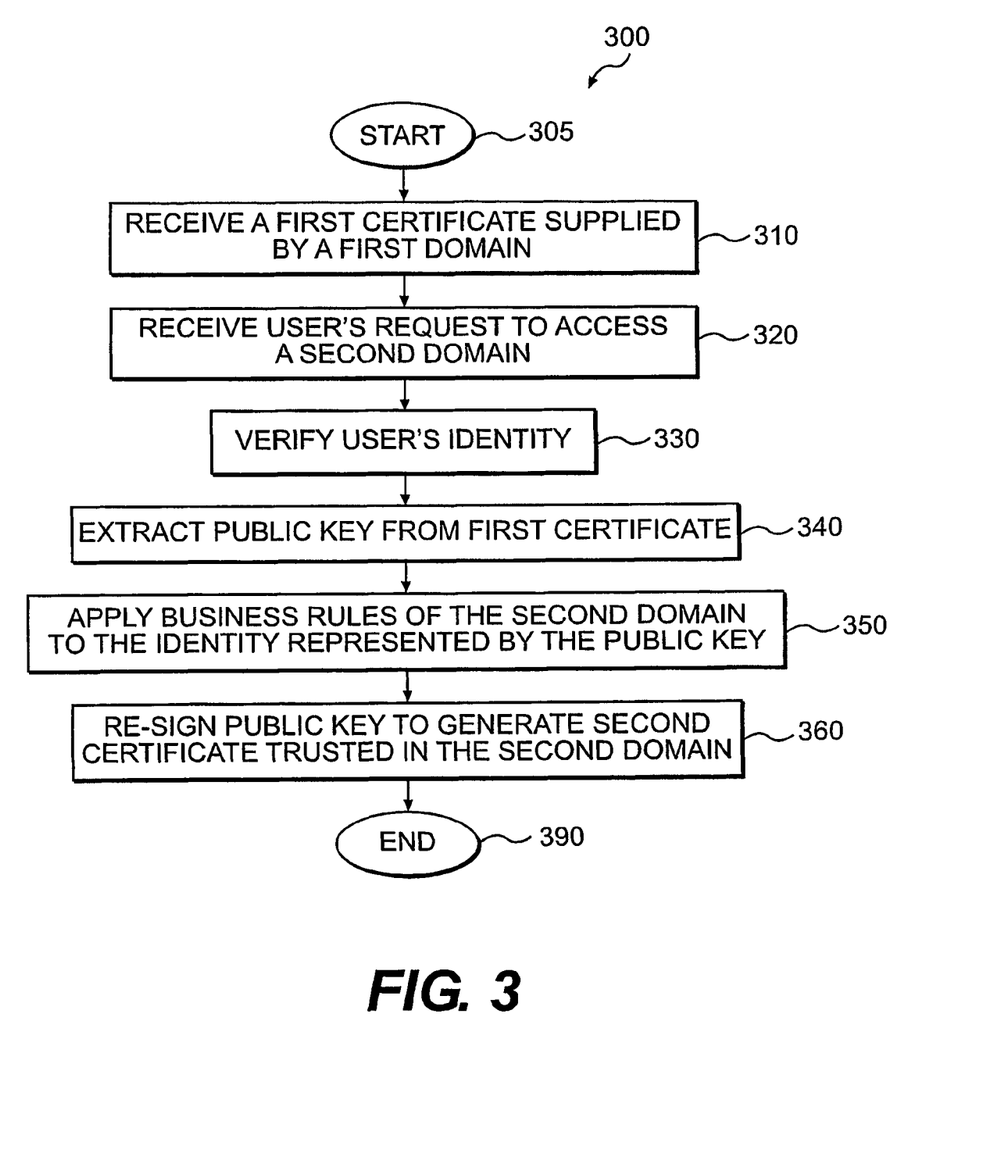
FIG. 3 is a flow chart illustrating an exemplary CACHET method.

FIG. 3 is a flow chart illustrating an exemplary CACHET method 300. The method starts in Block 305. In Block 310, the method 300 receives a first identity certificate 118/252 that is stored on a smart card 114/248 from a user 222. The certificate 118/252 is supplied by a first secure domain and associated with a private key 116/250 that is only known to the user 222. The certificate 118/252 includes a public key. In Block 320, the method 300 receives a request from the user 222 to access a second secure domain, which contains desired service 236. In Block 330, the method 300 verifies an identity of the user 222 using a private key infrastructure (PKI) process. In Block 340, if the user's identity certificate 118/252 is proved to be issued by a trusted CA and unexpired, the method 300 extracts the public key from the first identity certificate 118/252. In Block 350, the method 300 applies business rules of the second secure domain 236 to the identity represented by the public key. An example of simple business rules: a user is on an access list for the project database. An example of complex business rules: all GS-14 employees that work for the human resources (HR) department can access the HP database. In Block 360, the method 300 re-signs the public key to generate a second certificate, CACHET certificate 228. The second CACHET certificate 228 is associated with the private key 116/250 and trusted in the second secure domain containing desired service 236. The user 222 can access applications and services in the second secure domain containing desired service 236.

Figure 4:
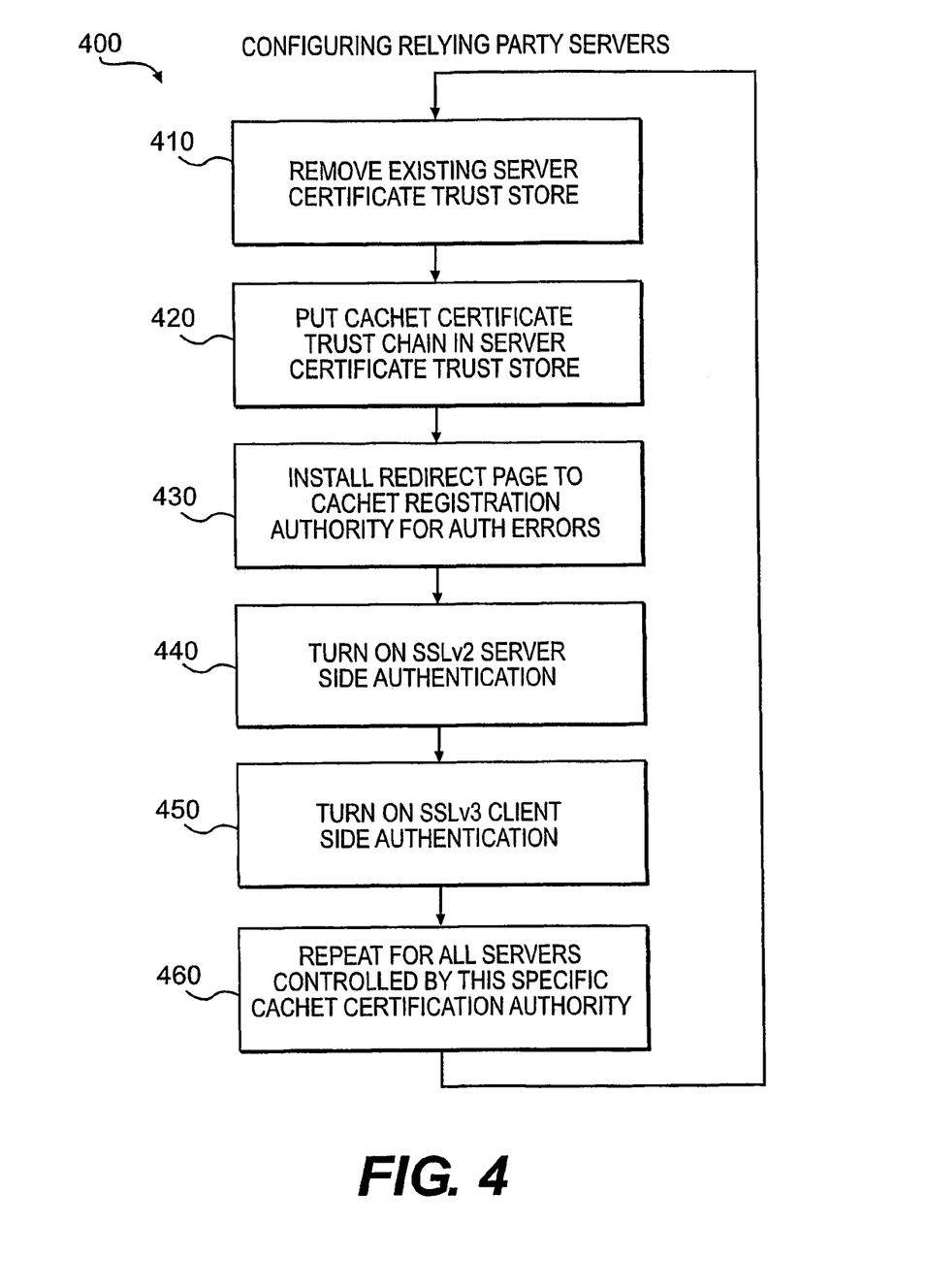
FIG. 4 is a flow chart illustrating an exemplary process used by an administrator for configuring servers of a relying party in accordance with the CACHET method of FIG. 3.

FIG. 4 is a flow chart illustrating an exemplary process 400 used by an administrator for configuring servers of a relying party desired service 236 in accordance with the CACHET method. In Block 410, the administrator of relying party's server for desired service 236 removes existing content in an existing/default server certificate trust store. The default trust store on many servers may contain the root certificates of hundreds of little known CAs 110 that approve certificates to be trusted without regard to the business rules of a CACHET relying party desired service 236. Therefore, it is important that the trust of these CAs 110, if any, be removed.

In Block 420, a certificate trust chain for one or more CACHET CA 244 may be placed in the server certificate trust store by the administrator of the server. A certificate trust chain is the one or more CAs in a certificate certification path that authorizes a specific CACHET certificate 228. For example, a certificate certification path for a specific certificate, S105135, may have three CAs; e.g., the certificate S150135 is signed by the "NGC Corp US CA," which is signed by "NGC US Policy CA," which is signed by "NG Root CA," which is the trust root. The certificate trust chain is the three CAs. Typically, the three CA are put in a trust storage so that the server can locate them immediately without searching. The CACHET root may be a chain of one. Each CACHET CA may represent one or more specific relying party's business rules that allow access to a user 222 or the user's computer 226 in accordance with the role of the user 222 in the organization. For example, the CACHET CA 244 may provide access to a single server for users who have CACHET privilege certificates 228 that correspond to either "customers" or "employees." A user 222 or the user's computer 226 may sign in any of multiple roles or privileges that the user holds. In Block 430, a re-direction page may be installed by the server administrator to manage authentication errors or failures.

If a single CACHET CA 244 is authorized for a relying part's server, re-direction may be automatic. If there are multiple allowed CACHET CAs 244, the user 222 may need to select a descriptive link that most describes the user's role in relation to the relying party's business rules. Having an identity certificate from a trusted external CA 110 does not mean that a CACHET certificate 228 will be issued. In other words, the user may still need to meet the business rules of the CACHET process. In Block 440, server authentication, such as SSLv2, may be turned on by the server administrator. This may be a default setting. In most servers, this process 440 may be a checkbox function. As part of this process 440, unencrypted access and/or encrypted access can be enabled. CACHET provides authorization, whereas the SSLv2 standards provide for encryption.

In Block 450, client authentication may be turned on by the server administrator to ensure that any access is strongly authenticated by a CACHET client certificate. This process 450 may be a checkbox function. No further manipulation of the server is needed for this or any other server whose access is controlled by a CACHET CA 244. The administrator never needs to add or remove a user from an access list. More importantly, access cannot be compromised by manipulation of one or more external access control databases because each authorization is a signed certificate and each revocation is also signed. An insider or hacker cannot launch an attack based on data manipulation because the integrity features of standard digital signatures may detect any such attempted manipulation. As indicated in Block 460, a single CACHET CA 244 may control the access on an unlimited number of separately administered servers, which may be located in an unlimited number of locations.

FIG. 5 is a flow chart illustrating an exemplary process 500 for controlling access to servers, i.e., relying parties 236, by clients, i.e., users 222 or user's computers 226. Blocks 502-555 describe open standard strongly authenticated communications, such as SSLv3, for illustration purposes. One skilled in the art will appreciate that this process may be equally applied to other authentication standards. In Block 502, a would-be user 222 or the user's computer 226 attempts to connect to the server or service controlled by a CACHET relying party 236, by accessing, for example, a uniform resource identifier (URI) or a uniform resource locator (URL).

In Block 505, the server 236, having been contacted with, for example, a "clienthello," commences the SSLv3 connection. In Block 510, the server certificate, a request for a client certificate and a list of one or more acceptable CACHET CA 244 may be sent by the server 236. This list of one or more acceptable CACHET CA 244 is typically of length one, but may be longer. In a normal SSL, the list of one or more acceptable CA includes hundreds of "trusted" CAs. In CACHET, scalability may be achieved by focusing all trust to a limited number of CACHET CA 244 trusted by the relying party for desired service 236. In Block 515, the client 222 receives and evaluates the data and a "ServerHelloDone," for example. The receipt of the data is a signal to evaluate the server's CACHET trust chain so that this trust may be evaluated in a path of length one or two because the CACHET trust chain may be in the client trust store. A CACHET trust chain may either be just a root CA, or a root CA with a subordinate CA. Therefore, the evaluation of trust only needs to check the signatures of one or two certificates to get to the root. The certificates in the trust chain are stored in the local memory of the server, so the server does not need to search for and download the trust chain (i.e., one certificate at a time). In Block 520, the client 222 may follow the standard and select a certificate 228 signed by one of the CACHET CA 244 in the list sent by the server 236. Typically only one certificate is qualified. This CACHET certificate 228 may be used in the server's authentication challenge, which is sent back to the server 236.

In Block 525, the returned challenge and associate client certificate is evaluated. Examples of conditions evaluated may be: is the challenge correctly signed, and if so, is the certificate valid in accordance with the rules of X.509? If the client 222 has a valid CACHET certificate 228, Blocks 530-555 continue as a normal strongly authenticated client-server relationship. In Block 530, the client 222 sends a cipher specification change request. In Block 535, the server 236 accepts cipher specification changes initiated by the client 222 and sends the finished message to the client 222 (Block 540). The client 222 may enter the secure application data exchange mode (Block 545) and exchange application data with the server 236 (Blocks 555, 550). The client 222 may have a CACHET certificate 228 with a matching private key 250 that is authorized by the CACHET CA 244 trusted by the relying party 236.

The unique processing of the present embodiment occurs when the client 222 cannot present an acceptable certificate. Reasons for an unacceptable certificate are noted above. Regardless of the reason for failure, the CACHET system provides a re-direction page, which connects the client 222 to the responsible CACHET Registration Authority 240 (Block 560). This detailed interaction is described in FIG. 6. Having completed the CACHET registration process successfully in Block 565, the client 222 is re-directed by Block 570 to the original resource that the client 222 was attempting to access. The client 222 may now have a valid CACHET certificate 228, so the processing of Blocks 500-555 may proceed without failure, granting access to the client 222 and assurance to the relying party 236.

Figure 6:
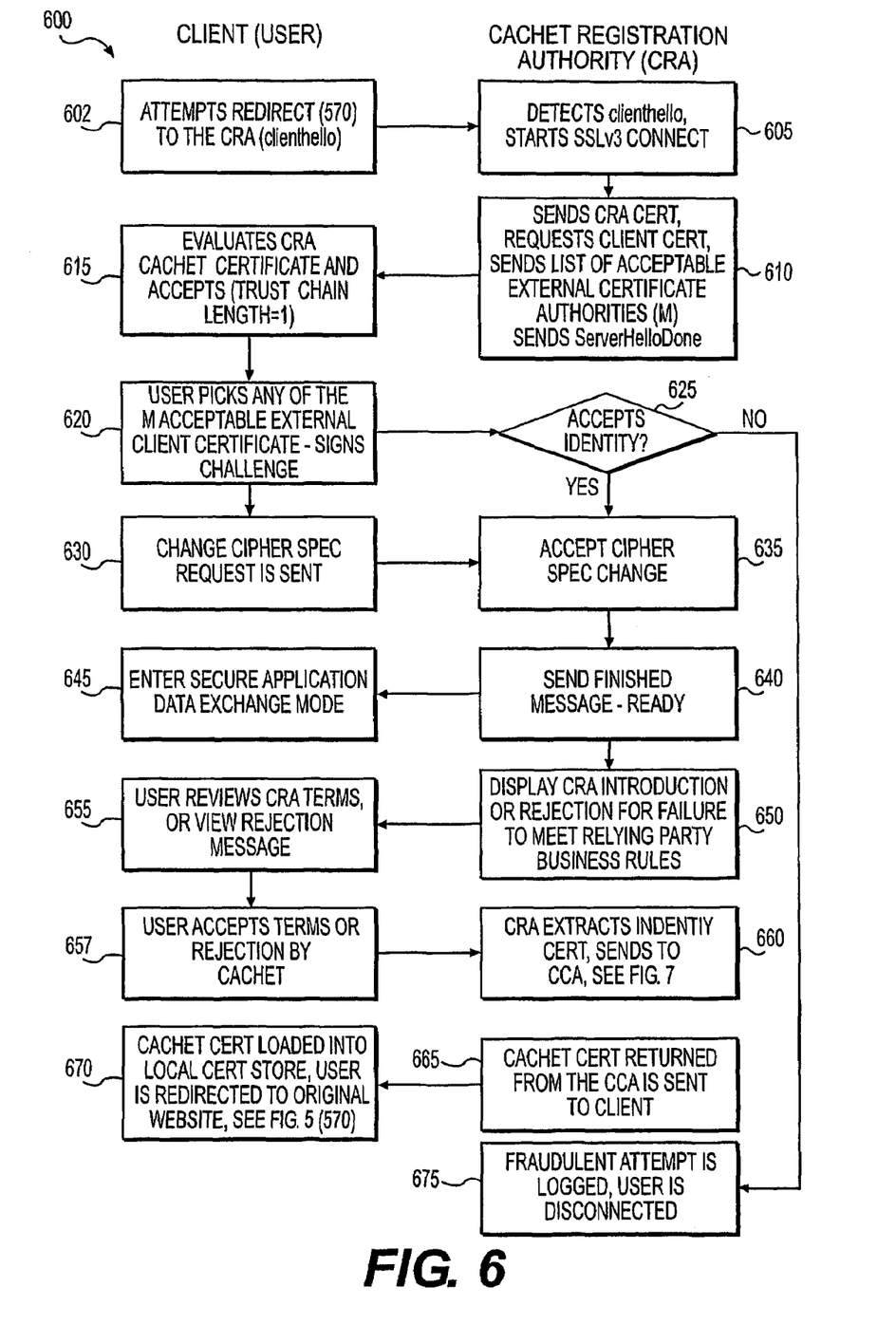
FIG. 6 is a flow chart illustrating an exemplary process of a CACHET Registration Authority.

FIG. 6 is a flow chart illustrating an exemplary process 600 for the issuance of a CACHET certificate 228 to the client 222. This process is a dialogue between the client 222 and the CACHET Registration Authority 240. Similar to FIG. 5, the SSL authentication indicated by Blocks 602-645 is described in connection with open standard SSL. One skilled in the art will appreciate that this process can be equally applied to other authentication standards. In Block 602, the client 222 attempts to be re-directed to the CACHET Registration Authority 240. In Block 605, the CACHET Registration Authority 240 detects the client's requests and starts, for example, a SSLv3 connection.

In Block 610, the CACHET Registration Authority 24 sends a list of acceptable external CAs 110 to the client 222. The list of acceptable external CAs 110 may be the list of CAs that are authorized by the CACHET Registration Authority 240 to provide identity-proofing and to create acceptable public-private key pairs. This list of acceptable CAs 110 may be under the control of the CACHET system trusted by the relying party 236. In Blocks 615, 620, the relying party 236 may receive, evaluate, and accept as many "donor" CAs, i.e., external CAs 110, as the relying party 236 believes meet its standards for identity proofing. Identity may be different from privilege. The identity may be extracted from the donor CAs 110, whereas the privileges may be issued by the CACHET system belonging to or trusted by the relying party 236. Typically, if and only if the client 222 can present an acceptable identity certificate 118/252 from an approved external CA 110 (Block 625) and can cryptographically demonstrate the matching private key 116/250, then will a connection be made to the CACHET Registration Authority 240. If these requirements are not met and the identity is not accepted (Block 625), the fraudulent attempt may be logged as in Block 675, and the connection may be discontinued.

If the client 222 meets the requirements and demonstrates a "candidate" identity (Block 625), the CACHET Registration Authority 240 accepts cipher specification changes (Block 635) initiated by the client 222 (Block 630) and sends the finished message to the client 222 (Block 640). The client 222 may enter the secure application data exchange mode (Block 645). Then, the CACHET Registration Authority 240 may introduce itself by presenting its terms in Block 650. Positive terms, i.e., offer to extend a privilege certificate, are only offered if the tendered identity also meets the terms and conditions established by the CACHET system business rules, as detailed for the CACHET Registration Authority 240. Rejections can occur at this point, and reasons are typically provided. In Blocks 655, 657, the client 222 reviews the terms and either accepts or rejects the terms. A rejection by the client 222 is grounds for a termination of the conversation, and no CACHET certificate 228 will be returned. If, as in Block 657, the client 222 accepts the terms of the relying party, an acceptance of the terms is returned.

Figure 7:
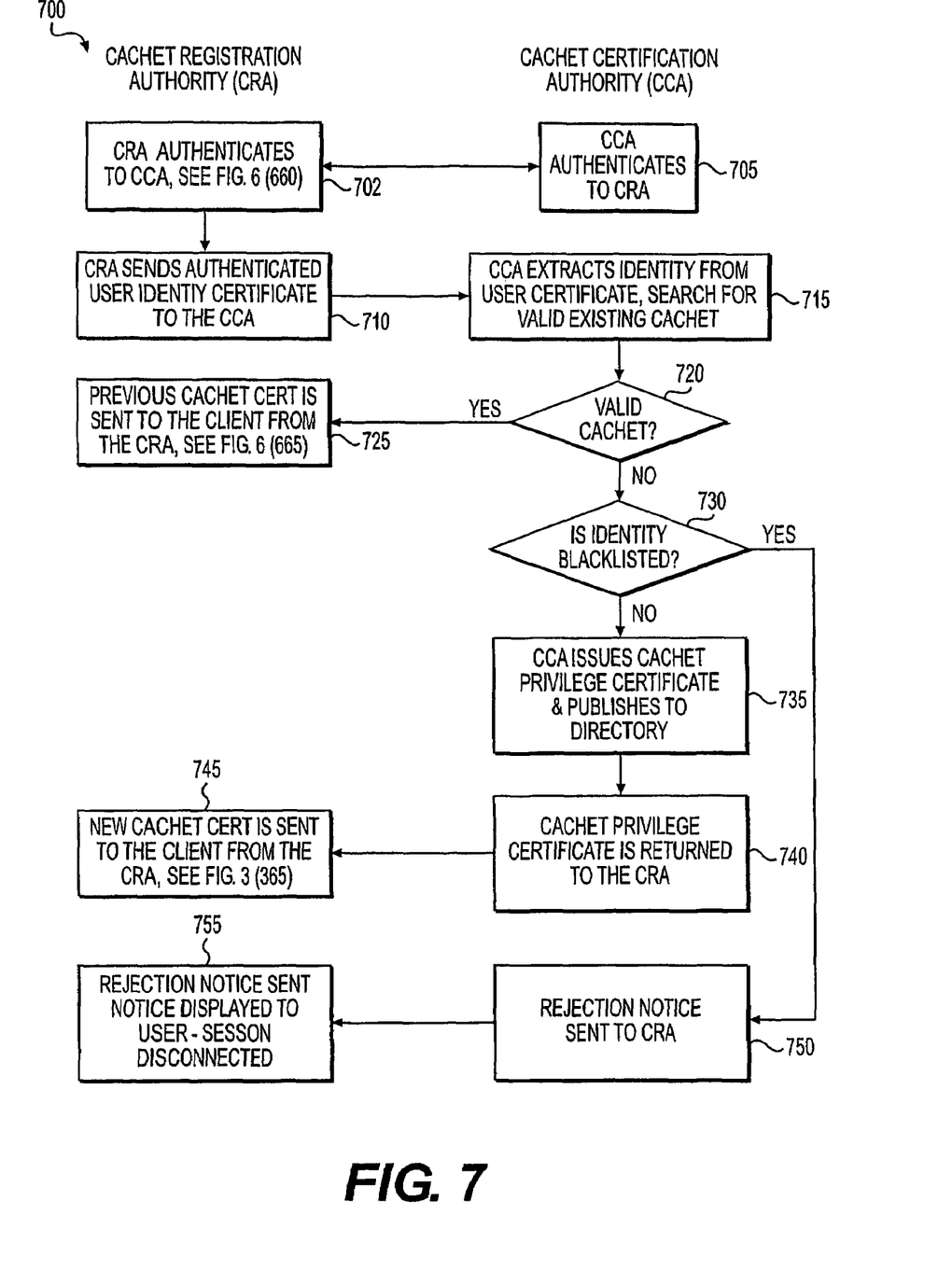
FIG. 7 is a flow chart illustrating an exemplary certificate issuance process by a CACHET Certification Authority (CA)

In Block 660, the CACHET Registration Authority 240 extracts the CACHET certificate 228 previously supplied in Block 620-625, and the validated CACHET certificate 228 may be sent to the CACHET CA 244 maintained by the relying party 236. FIG. 7 discusses the processing performed by the CACHET CA 244 in order to return a valid CACHET certificate 228. Once the valid CACHET certificate 228 is returned by the CACHET CA 244 in Block 665, the CACHET certificate 228 is presented to the client 222 in order for the CACHET certificate 228 to be placed in the local client certificate store, and a link is supplied for the client 222 to re-direct to the originally denied resource (Block 670), entering into the process flow again in FIG. 5, Block 500.

FIG. 7 is a flow chart illustrating an exemplary process 700 of the CACHET CA 244. The CACHET Registration Authority 240 has obtained a public certificate from a user 222, for example, as part of the SSLv3 protocol. The CACHET CA 244 authenticates the CACHET Registration Authority 240 in Block 702, using the same SSL processes described earlier in detail. Similarly, the CACHET Registration Authority 240 authenticates the CACHET CA 244 in Block 705. One skilled in the art will appreciate that this process can be equally applied to other authentication standards. Once the authorities have mutually authenticated, in Block 710, the CACHET Registration Authority 244 sends a copy of the authenticated client certificate 118/252, that has been cryptographically tied to the user 222, to the CACHET CA 244.

In Block 715, the CACHET CA 244 extracts identity data from the certificate 118/252. The identity certificate 118/252 is known to be valid, since the CACHET Registration Authority 240 would not have sent an invalid identity certificate. In other words, before further processing, the CACHET Registration Authority 240 has validated the validity of certificate 118/252, the revocation status, and validity dates, which are all positive. From the data contained in the identity certificate 118/252, the CACHET CA 244 obtains the identity of the client 222, the external CA 110 that certified the identity, the certified public key of the client 222, and the serial number of certificate 118/252 for that identity. In Block 720, the CACHET CA 244 then searches for a valid, existing CACHET certificate 228 derived from the certificate 118/252. If such a CACHET certificate 228 is found, the previous CACHET certificate 228 is returned to the CACHET Registration Authority 240 in Block 725, which downloads it into the trusted store of the client 222, as discussed above in FIG. 6, Block 665.

If the existing CACHET certificate 228 is not found (Block 720), then, in Block 730, a critical check is made to determine if the identity has been "blacklisted." While the CACHET Registration Authority 240 makes the decision (Block 650) if the identity meets the business rules for the specific implementation of a CACHET system, it is the CACHET Certification Authority 244 that determines if a privilege has ever been revoked for "cause." Cause means that the client has been determined to be "untrustworthy," despite meeting the nominal business rules. This information may be recorded, for example, by the presence of a manually revoked certificate for "cause." All certificates manually revoked by a CA Officer may be for cause. Details of manually revoked certificates are discussed in FIG. 8.

In Block 735, if the identity is not blacklisted, the identity is issued a new CACHET certificate 228, which is published to the established repository, typically a directory. The CACHET certificate 228 is returned in Block 740 to the CACHET Registration Authority 240, which in Block 745, installs the CACHET certificate 228 in the client's certificate store on computer 226, as discussed above in FIG. 6, Block 665. If an identity has in fact been blacklisted, a rejection notice may be sent from the CACHET CA 244 back to the CACHET Registration Authority 240 in Block 750, which displays that information in place of offering a CACHET certificate 228 in Block 755. This is the process shown above in FIG. 6, Block 650.

These CACHET certificates 228 can be as short-lived as desired. The life of a CACHET certificate 228 may be as short as an hour. The lifetime may be a balance between having to re-authenticate when a CACHET certificate 228 expires, against the cost of not being able to cancel access after the fact. If, for example, it takes four hours to decide that a user should be removed for access, a four hour CACHET certificate 228 may be adequate. By the time the decision is made, any previous CACHET certificate 228 has expired. Other organizations may want to re-qualify access on a weekly basis, which may be achieved by making the CACHET certificate 228 good only for a week. This means that the CRL issued may be exceedingly short, i.e., the length of the list of cancelled CACHET certificates may be short. According to the X.509 standard, expired certificates do not need to be published in a CRL. In fact, expired certificates need to be removed in future CRL if they have expired. In the above example, because all CACHET certificates 228 expire in four hours, and it takes longer to decide whether to revoke the CACHET certificate 228, the length of the CRL will be zero. The current DoD CRL has a million entries out of 4 million, requiring a 900 second download. This corresponds to a revoke rate of 25% over a 156-week i.e., 3 year, period. In this example, if the GS-13s are 5% of the population of 4M, and certificates are for a week, the local CACHET CRL would be a factor of 20×156 smaller, or 3,120 times smaller. A 900 second CRL download becomes 0.25 seconds once a day for each of the relying party servers.

A unique function of the CACHET CA 244 is to automatically revoke CACHET certificates 228 for obsolete or compromised keys. On a periodic basis, the CACHET CA 244 downloads the CRL of each of the trusted CA 110. In the example of the FBI as a relying party, the CACHET CA 244 downloads the CRLs from the FBI, the Treasury Department and the DoD. At the refresh rate of the CRLs, they are examined to determine if a CACHET certificate 228 has been issued to a revoked certificate. If so, the CACHET certificate 228 is revoked. In this example, by performing this function once, the processing load for CRLs for the 58 FBI servers may be reduced by a factor of 3,120 each, or for this case, a factor of 58*3,120, or 180,960 times. As the protected secrets get more sensitive, i.e., with fewer trusted users, or more distributed, the leverage factor increases dramatically.

Figure 8:
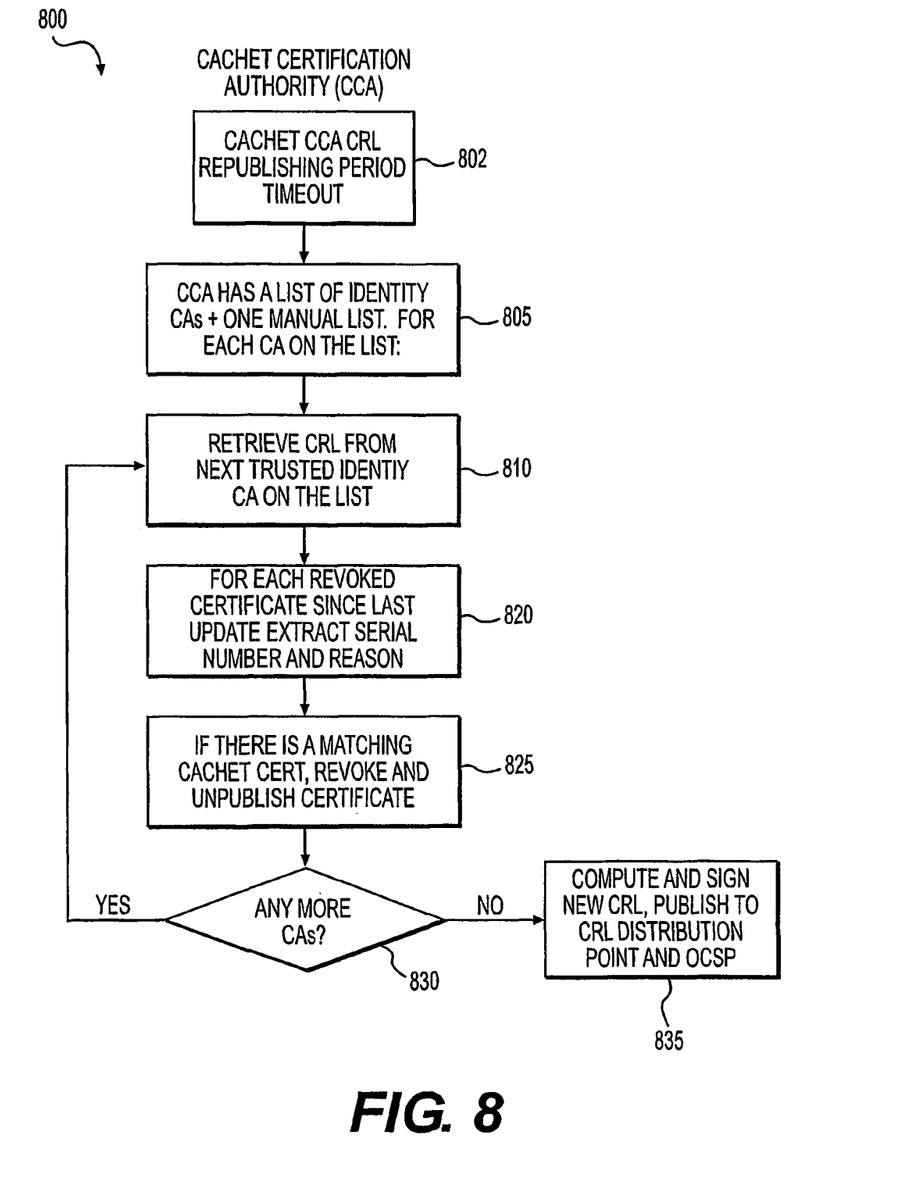
FIG. 8 is a flow chart illustrating an exemplary process of the CACHET system of FIG. 2 for generating a CACHET certificate revocation list (CRL) or on-line certificate status protocol (OCSP) based on revocations of a donor PKI.

FIG. 8 is a flow chart illustrating an exemplary process 800 for generating the optional Certification Revocation List (CRL), and the resultant (optional) On-Line Certificate Status Protocol (OCSP). The CACHET system typically relies entirely on the external CAs 110 to revoke certificates 118/252 that are superseded or compromised, for lost tokens and private keys, or for lost or misappropriation of identity. The CACHET CA 244 follows the lead of external CAs 110 for all revocation, except for "breach of trust." Breach of trust means that, despite the external organizations continued attestation of identity and status, the operators of the CACHET system have empirically determined that they, and they alone, do not intend to further trust the client 222 or the user's computer 226.

In Block 802, the CACHET CA 244 awakens according to its own policy and processes revocations. For each external CA 110 that the CACHET CA 244 trusts and for the local "breach of trust" list, the following process occurs, starting in Block 805. In Block 810, the CRL for the next CA 110 is retrieved. The signature on the CRL is validated in accordance with, for example, the X.509 standard. If all CRLs have been processed, the manual list may be processed. In Block 820, the serial number and reason code for each revoked identity certificates 118/252 in the CRL or manual entry list issued since the last update process may be retrieved.

In Block 825, the CACHET CA 244 searches its database to determine if there is a derivative, matching CACHET certificate 228 that was based on the revoked identity certificate 118/252, issued to that identity-CA combination. If so, the reason code may be translated to the CACHET CA standard, and the CACHET certificate 228 is revoked and unpublished. This process has the effect of terminating privileges that are based on invalid identities without the expense of manual determination of invalidity by the CACHET system. In essence, the external CAs 110 perform all the work.

Once all the CAs 110 and the manual "blacklist" have been processed, the CACHET CA 244 computes and signs in accordance with, for example, the X.509 standard, a new CACHET CRL, which is then distributed to the CRL distribution point and any OCSP responders associated with the CACHET CA 244. At this point, the CACHET CA 244 resets the republishing timeout and awaits the next pass, as shown in Blocks 830, 835.

The CACHET system and method may support the establishment of identity and privilege in a Multi-Level Secure (MLS) environment. The various CACHET CAs 244 and privilege databases are constructed to exist at each separate security level. If a user 222 attempts to connect across the MLS firewalls, and, if the smart card keys are from a trusted CA, the connection attempt is re-directed to the CACHET server inside the secure domain. In this protected environment, the CACHET Registration Authorities 240, CACHET CAs 244 and the privilege databases make a direct decision on the access privileges of the user 222. In this manner, the establishment of basic identity is performed at the higher domain, rather than depending on a transitive identity, such as Security Assertion Markup Language (SAML), which occurs at the lower level security domain and thus is subject to all the attacks that could occur at the reduced security domain. Each independent server in the higher security domain makes an independent decision on the PKI keys, and the CACHET certificates 228 are signed at the appropriate security level, which is at the level of the data accessed.

In summary, a relying party organization can leverage the PKI infrastructures of the home organizations from which their users come. Specifically, the CACHET system and method are compliant with X.509v3. The CACHET system and method further avoid the cost of issuing smartcards or tokens to the relying party organization, relieve the need for face-to-face registration by the relying party, and avoid burdening the user with "yet another token/passphrase." The CACHET system and method further leverage the identity proofing of the home organizations, provide the relying party organization 100% business process control, and provide access as secure as PKI allows at a low cost. The CACHET system and method also convert PKI implementations that do not scale into a highly scalable system, do not need cooperation or interface from the external organizations, and provide appropriately located Multi-Level Secure (MLS) authority.

Figure 9:
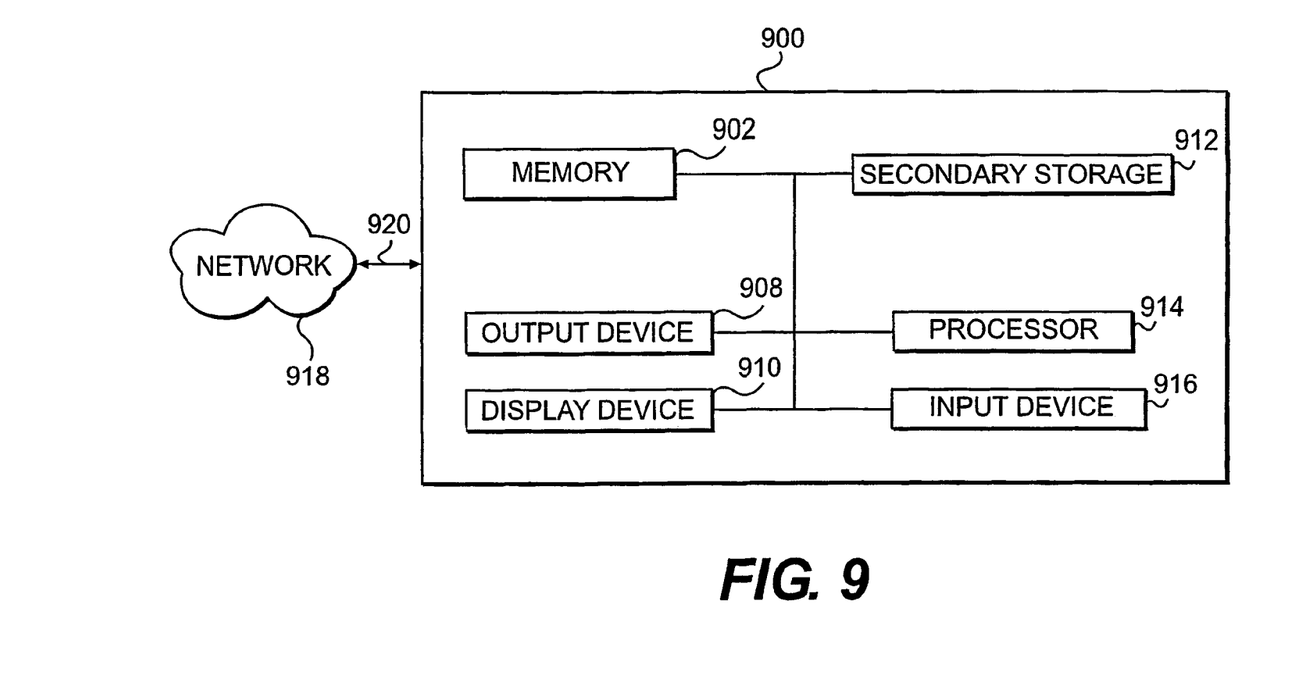
FIG. 9 illustrates exemplary hardware components of a computer that may be used in connection with the CACHET system and method.

FIG. 9 illustrates exemplary hardware components of a computer 900 that may be used in connection with the CACHET system and method. The computer 900 includes a connection 920 with a network 918 such as the Internet or other type of computer or telephone network. The computer 900 typically includes a memory 902, a secondary storage device 912, a processor 914, an input device 916, a display device 910, and an output device 908.

The memory 902 may include random access memory (RAM) or similar types of memory. The secondary storage device 912 may include a hard disk drive, floppy disk drive, CD-ROM drive, or other types of non-volatile data storage, and may correspond with various databases or other resources. The processor 914 may execute information stored in the memory 902, the secondary storage 912, or received from the Internet or other network 918, such as the digital image information. The input device 916 may include any device for entering data into the computer 900, such as a keyboard, keypad, cursor-control device, touch-screen (possibly with a stylus), or microphone. The display device 910 may include any type of device for presenting visual image, such as, for example, a computer monitor, flat-screen display, or display panel. The output device 908 may include any type of device for presenting data in hard copy format, such as a printer, and other types of output devices including speakers or any device for providing data in audio form. The computer 900 can possibly include multiple input devices, output devices, and display devices.

Although the computer 900 is shown with various components, one skilled in the art will appreciate that the computer 900 can contain additional or different components. In addition, although aspects of an implementation consistent with the CACHET system and method are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer 900 to perform a particular method.

Although the CACHET system and method has been described in terms of exemplary embodiments, it will be apparent to those of skill in the art that numerous modifications may be made without departing from the true spirit and scope of the embodiments. For example, any authentication mechanism, which depends on X.509 certificates, can be adapted for CACHET. Kerberos system that has been PKI certificate enabled may be able to use a foreign private key from an external CA 110 by using the CACHET system and method to generate a certificate 228 with the appropriate privilege and extensions for Public Key Cryptography for Initial Authentication in Kerberos (Kerberos PKINIT). By this method, a relying party that uses Kerberos-based single sign on may use another organization's smartcards for access to the organization's internal machines by generating a CACHET certificate 228 for the external private key 116/250 held on the external smartcard 114/248.

What is claimed is:

1. A computer-implemented common access card heterogeneous (CACHET) method, comprising:
   receiving an identity certificate from a user, the identity certificate being supplied by a first secure domain and associated with a private key that is only known to the user, the identity certificate including a public key;
   receiving a request from the user to access a second secure domain;
   verifying an identity of the user using a private key infrastructure (PKI) process;
   if the identity certificate is proved to be issued by a trusted certificate authority (CA) and unexpired, extracting the public key from the identity certificate;
   applying business rules of the second secure domain to the public key, wherein the applying business rules of the second secure domain to the public key includes determining that users with an identify certificate supplied by the first secure domain is permitted to access the second secure domain;
   re-signing the public key to generate a CACHET certificate, the CACHET certificate being associated with the private key and trusted in the second secure domain, wherein the user is permitted to access applications and services in the second secure domain;
   wherein the CACHET certificate is issued without a need to replace the private key; and wherein the verifying, extracting, applying, and re-signing steps are performed in a same multi-level secure (MLS) domain, without regard to assertions made by systems at a lower level of security.

2. The method of claim 1, further comprising:
   receiving a second request from the user to access a third secure domain;

applying business rules of the third secure domain to the public key; and re-signing the public key to generate a second CACHET certificate, the second CACHET certificate being associated with the private key and trusted in the third secure domain, wherein the user can access applications and services in the third secure domain.

3. The method of claim 1, further comprising configuring a server in the second secure domain, the configuring step further comprising:

removing existing contents in a server certificate trust store;

placing one or more CACHET certificate trust chains into the server certificate trust store;

installing a re-direction page to a CACHET registration authority to be displayed upon a failed authorization attempt;

turning on a server side authentication for confidentiality; and turning on a client side authentication to ensure a strong client authentication.

4. The method of claim 1, further comprising:

detecting an attempted access by the user of a uniform resource identifier (URI) of the second secure domain;

the second secure domain starting a connection;

the second secure domain requesting a CACHET certificate that is signed by one or more of acceptable CACHET CAs;

enabling the user to select a CACHET certificate to sign a connection challenge and to return the signed connection challenge;

the second secure domain validating the CACHET certificate and the signed connection challenge returned by the user;

enabling the user to send a cipher specification change request;

the second secure domain accepting the cipher specification change request; and the second secure domain sending a message to the user, allowing the user to access the applications and services in the second secure domain.

5. The method of claim 1, wherein the identity certificate is not issued by a trusted CA, the method further comprising:

detecting an identity certificate not issued by a CACHET CA;

re-directing the user to a CACHET registration authority;

interacting with the CACHET registration authority, wherein the CACHET registration authority determines that access should not be allowed because there is no available identity certificate vouched for by a trusted CA; and informing the user that access cannot be granted.

6. The method of claim 5, further comprising detecting a missing identity certificate.

7. The method of claim 1, further comprising:

a CACHET registration authority detecting a connection attempt from the user;

the CACHET registration authority starting a connection process;

the CACHET registration authority requesting a client's identity certificate by sending a list of trusted CAs acceptable to the second secure domain;

enabling the user to select one of one or more identity certificates acceptable to the CACHET registration authority and to sign an authentication challenge;

the CACHET registration authority accepting a valid identity certificate issued by one of the trusted CAs acceptable to the second secure domain, thereby validating the signed authentication challenge;

enabling the user to send a cipher specification change request;

the CACHET registration authority accepting the cipher specification change request; and the CACHET registration authority sending a message to the user, allowing the user to access the applications and services in the second secure domain.

8. The method of claim 7, further comprising:

the CACHET registration authority evaluating the business rules for certificate issuance and determining that the user's identity meets the business rules;

the CACHET registration authority extracting an identity certificate from a trusted CA and sending the identity certificate to a CACHET CA to request a CACHET certificate;

the CACHET CA finding an existing valid CACHET certificate in an internal storage;

the CACHET CA returning the valid CACHET certificate to the CACHET registration if there is no black list entry for the user's identity and there is no valid CACHET certificate, the CACHET CA signing a new valid CACHET certificate that is derived from the identity certificate presented by the trusted CA, and sending the new valid CACHET certificate to the CACHET registration authority;

if there is a blacklist entry for the user's identity, the CACHET CA sending a notice of rejection to the CACHET registration authority;

enabling the user to review terms for acceptance and to accept the terms by responding positively;

enabling the user to download the valid CACHET certificate; and re-directing the user to an original URI attempted by the user, wherein the CACHET certificate allows the user to access the applications and services in the second secure domain.

9. The method of claim 8, further comprising the CACHET CA detecting a presence of a blacklist entry by reviewing previous CACHET certificates issued to the user but revoked for a reason code corresponding to a "blacklisted" state.

10. The method of claim 1, further comprising performing authentication between a CACHET registration authority and a CACHET CA, the performing authentication step further comprising:

the CACHET registration authority sending a user's identity certificate to the CACHET CA;

the CACHET CA extracting the user's identity from the user's identity certificate, locating and returning to the CACHET registration authority CACHET certificates that are previously issued and currently valid;

the CACHET CA checking for a blacklist mark on the user's identity, wherein the blacklist mark is a CACHET certificate that is revoked for cause;

the CACHET CA issuing a valid CACHET certificate that contains the public key from the identity certificate presented to the CACHET registration authority, wherein the valid CACHET certificate is issued for a length of time not to exceed a lifetime of the user's identity certificate and not to exceed a lifetime established by the business rules of the second secure domain; and the CACHET CA publishing the valid CACHET certificate, and returning the valid CACHET certificate to the CACHET registration authority and the user.

11. The method of claim 1, further comprising:
for each external CA that is trusted by the second secure domain, retrieving a certificate revocation list (CRL) from the external CA;
identifying all newly revoked identity certificates on the CRL that have not been previously processed by the external CA;
extracting a date, a reason code and a serial number of each revocation;
converting the reason code from a first standard of the external CA to a second standard used by the second secure domain;
revoking a derivative CACHET certificate, using the converted reason code and the date;
un-publishing the derivative CACHET certificate from a public directory; and
computing, signing, and publishing the CRL to CRL distribution points and online certificate status protocol (OCSP) responders.

12. The method of claim 1, further comprising:
issuing single sign on certificates for a pair of keys including the public key and the private key, wherein the single sign on certificates are issued without the need to replace the private key.

13. A non-transitory computer readable medium providing instructions for a common access card heterogeneous (CACHET) method, the instructions comprising:
receiving an identity certificate from a user, the identity certificate being supplied by a first secure domain and associated with a private key that is only known to the user, the identity certificate including a public key;
receiving a request from the user to access a second secure domain;
verifying an identity of the user using a private key infrastructure (PKI) process;
if the identity certificate is proved to be issued by a trusted certificate authority (CA) and unexpired, extracting the public key from the identity certificate;
applying business rules of the second secure domain to the public key, wherein the applying business rules of the second secure domain to the public key includes determining that users with an identify certificate supplied by the first secure domain is permitted to access the second secure domain;
re-signing the public key to generate a CACHET certificate, the CACHET certificate being associated with the private key and trusted in the second secure domain, wherein the user is permitted to access applications and services in the second secure domain;
wherein the CACHET certificate is issued without a need to replace the private key; and
wherein the verifying, extracting, applying, and re-signing steps are performed in a same multi-level secure (MLS) domain, without regard to assertions made by systems at a lower level of security.

14. The non-transitory computer readable medium of claim 13, further comprising instructions for:
receiving a second request from the user to access a third secure domain;
applying business rules of the third secure domain to the public key; and
re-signing the public key to generate a second CACHET certificate, the second CACHET certificate being associated with the private key and trusted in the third secure domain, wherein the user can access applications and services in the third secure domain.

15. The method of claim 1 wherein the applying business rules of the second secure domain to the public key further includes determining that user, identified by the identity certificate, is permitted to access the second secure domain.

16. The method of claim 1 further comprising determining that the user does not have a CACHET certificate, wherein the re-signing the public key to generate a CACHET certificate is done is response to determining that the user does not have a CACHET certificate.

17. A computer-implemented common access card heterogeneous (CACHET) method, comprising:
receiving an identity certificate of a user from a computer, the identity certificate identifying a user, including a public key, being supplied by a first secure domain, indicating that the user may access the first secure domain, and being associated with a private key that is only known to the user;
receiving a request from the computer for the user to access a second secure domain;
verifying an identity of the user using the identity certificate and a private key infrastructure (PKI) process;
if the identity certificate is proved to be issued by a trusted certificate authority (CA) and unexpired, extracting the public key from the identity certificate;
a registration authority separate from the first secure domain and from the second secure domain applying business rules of the second secure domain to the public key to determine if the user is permitted to access the second secure domain;
generating a new certificate, based on satisfaction of the applied business rules, that provides the user access to the second secure domain, wherein the new certificate is generated by re-signing the public key, the new certificate being associated with the private key and trusted in the second secure domain, wherein the user is permitted to access applications and services in the second secure domain;
wherein the CACHET certificate is issued without a need to replace the private key; and
wherein the verifying, extracting, applying, and re-signing steps are performed in a same multi-level secure (MLS) domain, without regard to assertions made by systems at a lower level of security.

* * * * *